United States Patent [19]

Doninger

[11] Patent Number: 4,939,831
[45] Date of Patent: Jul. 10, 1990

[54] END FINISHING DEVICE FOR ROPE, WIRE, CABLE, AND THE LIKE

[76] Inventor: Michael B. Doninger, 1815 Yale Rd., Merrick, N.Y. 11566

[21] Appl. No.: 388,693

[22] Filed: Aug. 2, 1989

[51] Int. Cl.⁵ .............................................. B23P 19/04
[52] U.S. Cl. ...................................................... 29/263
[58] Field of Search ................. 29/246, 249, 256, 258, 29/259, 260, 262, 263, 265

[56] References Cited

U.S. PATENT DOCUMENTS

| | | | |
|---|---|---|---|
| 3,579,796 | 5/1971 | Fillion | 29/263 |
| 3,651,557 | 3/1972 | Bagley | 29/263 |
| 3,972,103 | 8/1976 | Kenyon | 29/263 |

Primary Examiner—Robert C. Watson
Attorney, Agent, or Firm—David P. Gordon

[57] ABSTRACT

A reusable end finishing apparatus for rope, cord, wire, cable, poles, rods and the like is provided. The end finishing apparatus has an outer rigid sleeve and an inner compressible barbed gripping member which engages the end to be finished. The inner compressible gripping member is advanced into and compressed by the outer sleeve via a threaded rod and nut arrangement where the threaded rod is attached to the end of the gripping member and extends through the outer rigid sleeve.

20 Claims, 4 Drawing Sheets

PRELOADING OF GRIPPING MEMBER

END FINISHING DEVICE FOR ROPE, WIRE, CABLE, AND THE LIKE

BACKGROUND

The present invention is broadly directed to devices for the end finishing of terminations of items such as rope, wire, cable, cord, poles, rods and the like i.e. items whose terminations are commonly ragged and not readily coupled to other components unless provided with an end finishing attachment. More particularly, the present invention is directed to an end finishing device for items described above which is designed to be used without the need for any special tools and which can be re-used indefinitely and is readily combined in a threaded engagement with other components, such as turnbuckles, terminal lugs, toggle connectors for blind hole applications, casters, threaded nuts, holes, and connectors.

End finishing arrangements are well known and are currently widely used in a variety of commercial and industrial applications. The prior art end finishing devices, however, require either special tools or equipment and are not readily combined with other components and, in general, are not easily manufactured.

SUMMARY OF THE INVENTION

It is therefore an object of the present invention to provide an end finishing device for a wide variety of items such as ropes, wire, cable, cord, wood and metal poles and rods, and the like.

It is a further object of the present invention to provide an end finishing device which can be used without the need for special tools or equipment.

It is another object of the present invention to provide an end finishing device which can be readily combined with other components.

It is a further object to provide an end finishing device which can be easily manufactured.

In accord with the objects of the invention, an apparatus is provided for end finishing of a termination of an item such as rope, cord, wire, cable, poles, rods and the like. The apparatus generally comprises: a rigid, hollow sleeve member open at one end and having a relatively small opening at its opposite end; a threaded rod member adapted to freely pass through the relatively small opening in said sleeve member; a compressible gripping member having inwardly extending barbs adapted to grip a termination, said gripping member at least partially surrounding a longitudinal end portion of the termination, and configured to engage an end of said threaded rod, and to enable a close nesting fit within said sleeve member, said gripping member being thereby adapted to be drawn into the hollow sleeve member and compressibly engage said termination; and a threaded fastener located outside said sleeve member adjacent the relatively small opening thereof and peripherally engaged with said threaded rod member so that upon advancement of the threaded rod through said peripherally engaged threaded fastener, the gripping member and the termination engaged therewith are advanced a corresponding amount into the hollow sleeve member of the end finishing device.

In a preferred embodiment of the present invention the gripping member is in the form of two or more generally U-shaped barbed strips with the bases angularly displaced and engaged at one end of the threaded rod to thereby be adapted to be drawn into the hollow sleeve member.

A better understanding of the end finishing device invention, as well as additional advantages and objects will become apparent to those skilled in the art upon reference to the detailed description and accompanying drawings.

BRIEF DESCRIPTION OF THE DRAWINGS

FIG. 1 is a cross-section of a particular end finishing apparatus in accordance with the present invention;

FIG. 1(a) is an end view of the device in FIG. 1;

FIG. 1(b) and 1(c) are plan and elevation views respectively of the sleeve member of the device of FIG. 1;

FIG. 1(d) and 1(e) are plan and elevation views respectively of the gripping member of the device of FIG. 1;

DETAILED DESCRIPTION OF THE PREFERRED EMBODIMENTS

Figure 1F:
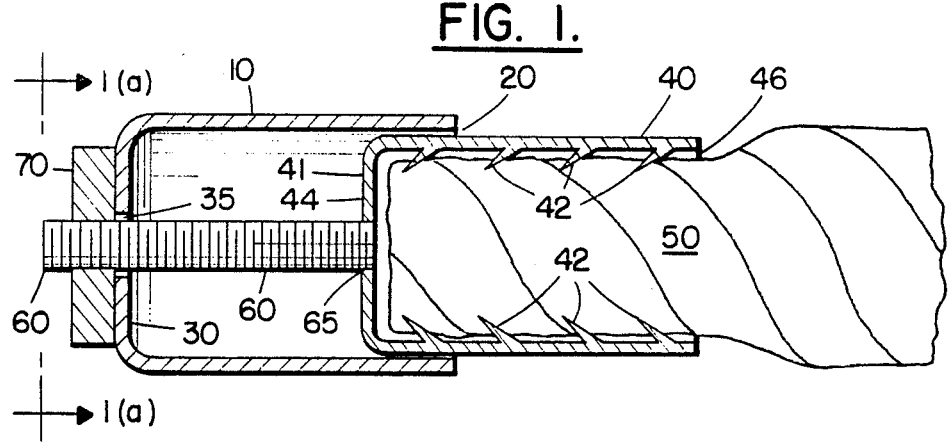
FIG. 1(f) is a cross-section of the preloaded gripping member of the end finishing apparatus prior to its insertion in the sleeve member.
Figure 1F:
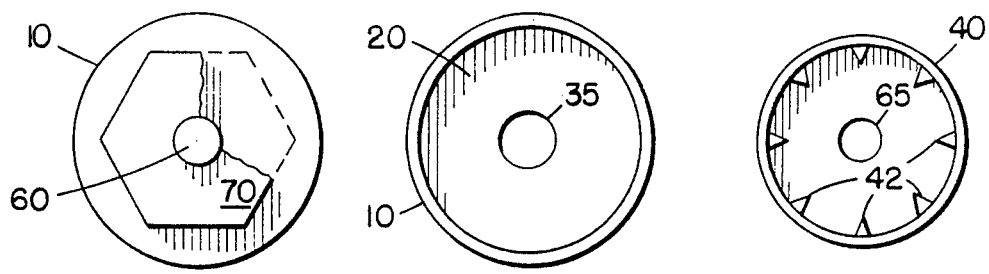
Figure 1F:
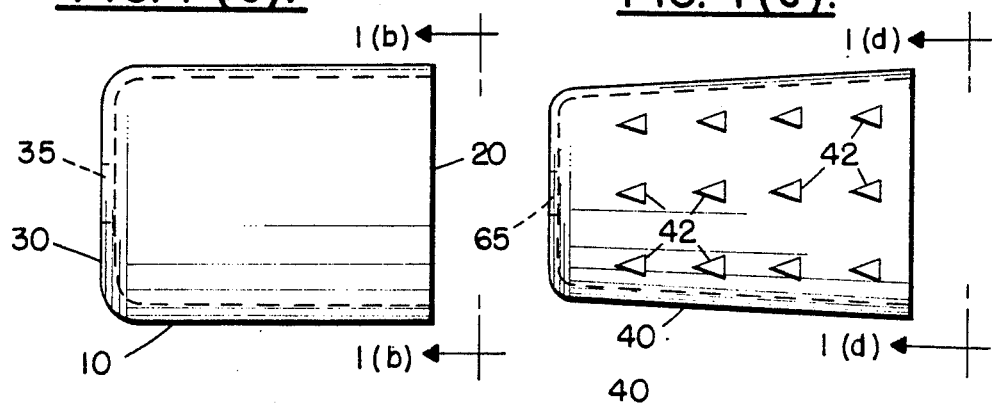
Figure 1F:
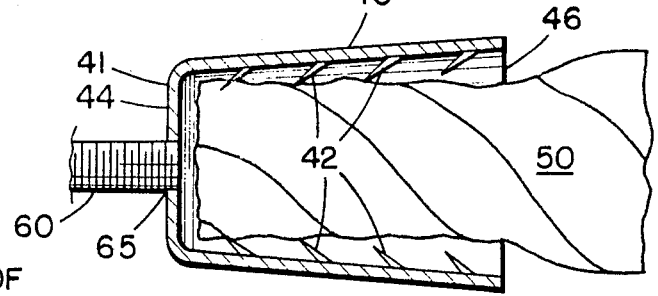

An end finishing apparatus in accordance with the present invention is shown in FIG. 1 and FIGS. 1(a)–1(f). The apparatus of FIG. 1 includes a rigid sleeve 10 suitably made of metal (brass, stainless steel) or plastic which is open at one end 20 and closed at the other end 30, except for a relatively small opening 35. A gripping member 40 is in the form of a cylindrical shell and receives a longitudinal end portion of the termination, e.g. rope end, 50 which is to be finished. The termination 50 is pushed into gripping member 40 (which is preferably pre-loaded as indicated in FIG. 1(f), the base 41 of which is slightly smaller than the initial width of the termination so that when gripping member 40 is drawn into sleeve member 10, the termination 50 is compressed within gripping member 40 and is gripped by barbs 42 which extend inwardly from the side walls or gripping member 40 and angle toward the closed end 44 of gripping member 40. As a result, termination 50 is gripped, or seized by penetrating barbs 42. Gripping member 40 is suitably made of a compressible metal e.g. brass or plastic configuration and is preferably slightly larger in outer cross-section, adjacent its open end 46, than the inner cross-section of sleeve 10 so that gripping member 40 nests in sleeve member 10 in a close bearing fit. With this arrangement, the barbs 42 of compressible brass or plastic gripping member 40 firmly engage termination 50 upon the advance of the gripping member 40 into sleeve 10 as hereinafter described.

Figure 4:
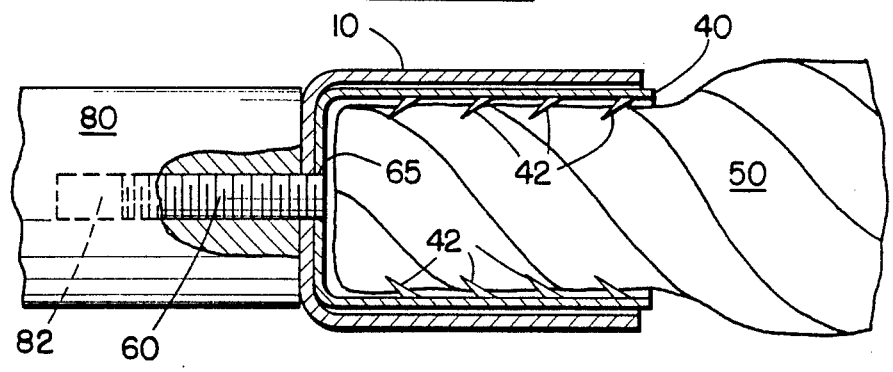
FIG. 4 shows an end finishing apparatus of the present invention in combination with another component.

With reference to FIG. 1, a threaded rod 60 passes freely through the central opening 35 of sleeve member 10 and engages threaded opening 65 in the closed end 44 of gripping member 40. If desired, the threaded rod 60 may be welded in opening 65, or attached in another desired manner to prevent removal. Hexagonal nut 70 peripherally engages threaded rod 60 and acts as a jam nut. Threaded rod 60 advances through hexagonal nut 70 as the hexagonal nut is turned, pliers only being required, and gripping member 40 and engaged termination 50 correspondingly advance by the same amount into sleeve member 10. As the hexagonal jam nut 70 is turned, gripping member 40 is compressed and nests snugly in sleeve 10 as illustrated in FIG. 4 with barbs 42 biting into termination 50. Under these circumstances (and where rod 60 is not welded in opening 65) threaded rod 60 can be unscrewed from gripping member 40 and removed from the device if desired. Or, if desired, with threaded rod 60 remaining in place, as shown in FIG. 4, the end finishing device of the present invention can be combined with other components, indicated at 80, which have a threaded passage 82. Components 80 can include terminal lugs, turn buckles, toggle connectors for blind hole applications, threaded nuts or holes, casters and the like.

Figure 2:
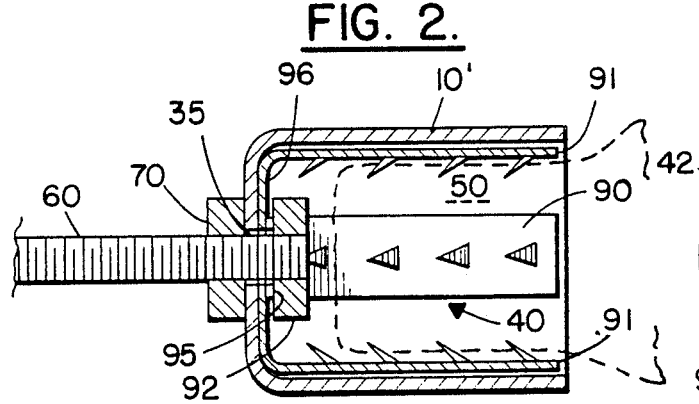
FIG. 2 is a cross-section of a further embodiment of the present invention.
Figure 2A:
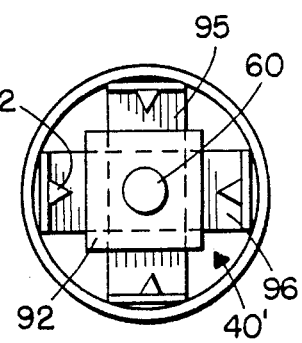
FIG. 2(a) is a plan view of the device of FIG. 2.
Figure 2B:
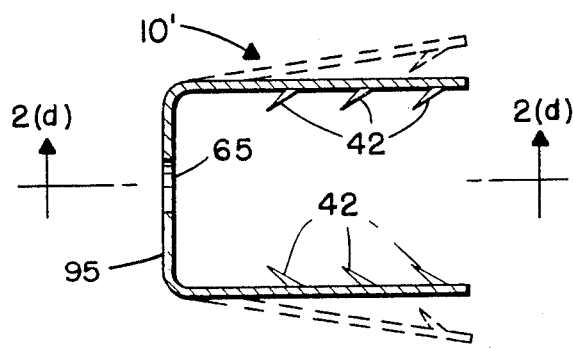
FIG. 2(b) is a sectional view of a portion of the gripping member of the device of FIG. 2.
Figure 2C:
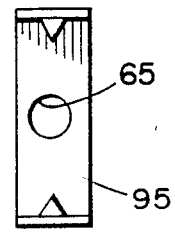
FIG. 2(c) is a plan view of the illustration in FIG. 2(b)
Figure 2D:
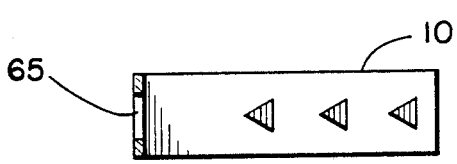
FIG. 2(d) is a side view of the illustration in FIG. 2(b)
Figure 2E:
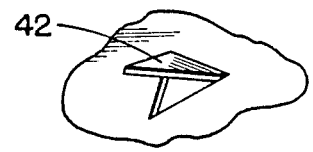
FIG. 2(e) is a perspective view of a portion of the illustration of FIG. 2(d)

FIG. 2 shows a further embodiment of the present invention wherein the gripping member 40' comprises two or more generally U-shaped strips 90, 91. As shown in FIGS. 2(a)–(e), these U-shaped strips have barbs 42 in the same manner as the previously described embodiment of FIG. 1 and are held together at their bases 95, 96, e.g. by retainer nut 92 which engages gripping member 40' to threaded rod 60. The U-shaped strips 90, 92 are angularly displaced and generally symmetrical about the longitudinal axis of threaded rod 60 as shown in FIG. 2(a). Termination 50 is engaged with gripping member 40' comprised of U-shaped barbed strips 90, 91 and the gripping member 40' is advanced into sleeve member 10' in the same manner as described hereinabove in connection with FIG. 1. U-shaped strips 90, 91 are preferably spring-loaded, and are suitably made of a resilient material, e.g. steel or a resilient plastic and fit snugly with sleeve member 10' so that barbs 42 firmly grip termination 50.

Figures 3, 3A:
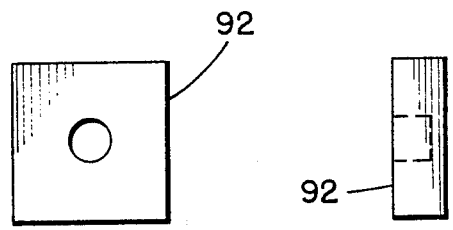
FIGS. 3, 3(a) and 3(b) are views of the retainer nut illustrated in FIG. 2.
Figure 3B:
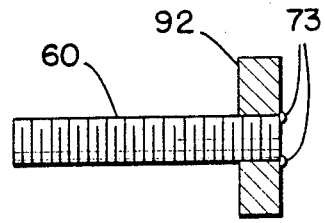

FIGS. 3 and 3(a) illustrate a type of retainer nut 92 which can be suitably employed with the embodiment of FIG. 2 to secure the gripping member 40' and enable removal of threaded rod 60 if desired. FIG. 3(b) illustrates a suitable arrangement when threaded rod 60 is to remain in place. Welds 73 affix the rod 60 to nut 92' for this purpose.

Figure 5A:
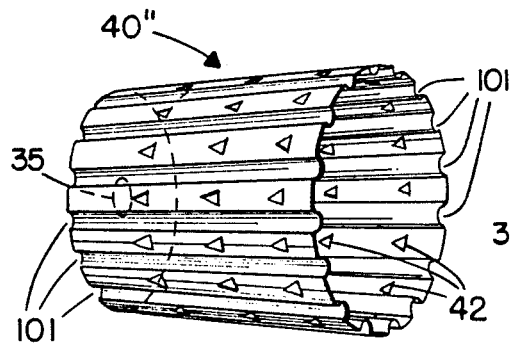
FIGS. 5(a)–5(c) show additional embodiments of the gripping member of the present invention.
Figure 5B:
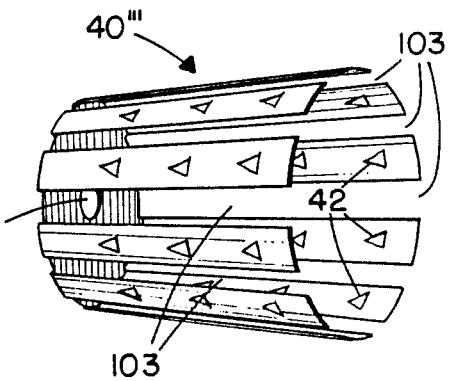
Figure 5C:
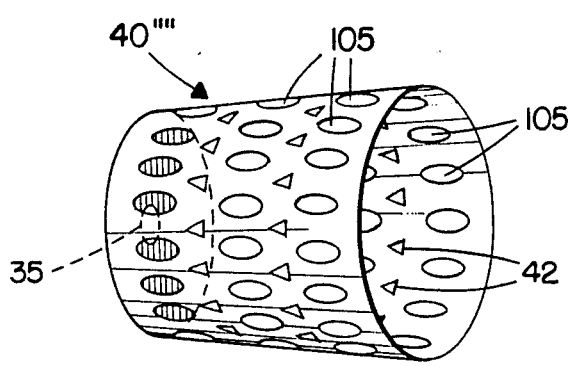
Figure 6A:
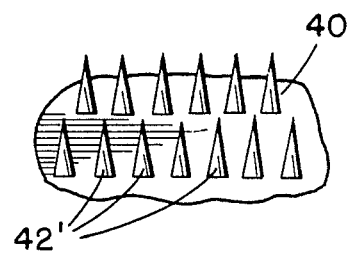
FIGS. 6(a)–6(d) show additional types of gripping arrangements for the present invention.
Figure 6B:
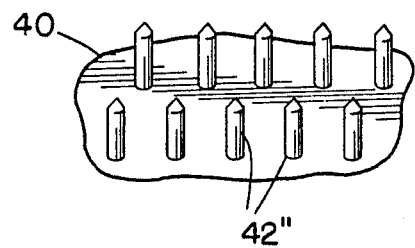
Figure 6C:
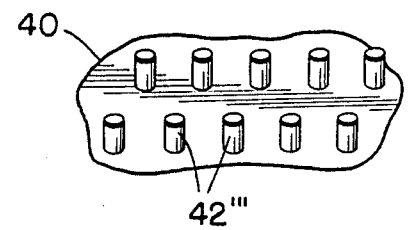
Figure 6D:
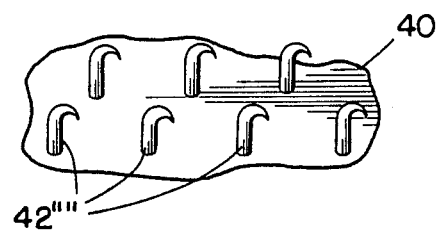

FIGS. 5(a)–5(c) show various embodiments of the compressible gripping member of the present invention. FIG. 5(a) illustrates a gripping member having longitudinal grooves 101 to facilitate crimping and compression of a termination; FIG. 5(b) shows a longitudinally slotted gripping member indicated at 103; and FIG. 5(c) illustrates an apertured gripping member, indicated at 105. All of these arrangements facilitate compression of the gripping member.

FIGS. 6(a)–6(d) illustrate various gripping elements which can be used with the gripping member of the present invention. These include needles, spikes, studs and hooks as illustrated in FIG. 6(a)–(d), all of which generally constitute "barbs".

There has been described and illustrated herein an end finishing device in accordance with the present invention. While particular embodiments of the invention have been described, it is not intended that the invention be limited exactly thereto, as it is intended that the invention be as broad in scope as the art will permit. Thus those skilled in the art will recognize that while metal construction is disclosed and preferred, other materials, such as plastics and composites may be used for particular purposes. Also, while the invention was described as using a hexagonal nut as a fastening means, and using a pliers for gripping the nut so as to advance the gripping means into the sleeve member, it will be appreciated that a common wrench or other similar means could be used for gripping the nut. Also, other fastening means such as a wing nut could be utilized in lieu of the hexagonal nut. Therefore it will be apparent to those skilled in the art that other changes and modifications may be made to the invention as described in the specification without departing from the spirit and scope of the invention.

I claim:

1. Apparatus for end finishing of a termination of an item such as a rope, cord, wire, cable, pole, rod, or the like which comprises:
   (a) a hollow rigid sleeve member open at one end and having a relatively small opening at its opposite end;
   (b) a threaded rod member adapted to pass freely through the relatively small opening in said sleeve member;
   (c) a compressible gripping member having inwardly extending barbs for gripping said termination, said gripping member at least partially surrounding a longitudinal portion of the termination and configured to engage an end of said threaded rod at one end, and to be compressible and enable a close nesting fit within said sleeve member, said gripping member being thereby adapted to be drawn into said hollow sleeve member; and
   (d) a threaded fastener located outside said sleeve member and adjacent the relatively small opening thereof and peripherally engaged with said threaded rod member so that upon advancement of the threaded rod through said peripherally engaged threaded fastener, the gripping member and the termination engaged therewith are advanced a corresponding amount into the hollow sleeve member, said compressible gripping member being thereby compressed and gripping said termination, whereby said termination of said item is finished and said item is available for its desired use with said apparatus fastened thereon.

2. Apparatus in accordance with claim 1 wherein said gripping member is comprised of at least two U-shaped strips engaged at their bases to said threaded rod.

3. Apparatus in accordance with claim 1 wherein said gripping member is a cylinder provided with longitudinal slots.

4. Apparatus in accordance with claim 1 wherein said gripping member is a cylinder provided with a plurality of apertures.

5. Apparatus in accordance with claim 1 wherein said gripping member is substantially cylindrical with longitudinal grooves.

6. Apparatus in accordance with claim 1 wherein said end of said threaded rod and said one end of said gripping member are integrally attached.

7. Apparatus in accordance with claim 1 wherein said end of said threaded rod is removably engaged with said end of said gripping member.

8. Apparatus in accordance with claim 1 wherein said inwardly extending barbs angle toward said one end of said gripping member.

9. Apparatus in accordance with claim 7 wherein said inwardly extending barbs angle toward said one end of said gripping member.

10. Apparatus in accordance with claim 2, wherein said end of said threaded rod and said one end of said gripping member are integrally attached, and wherein said inwardly extending barbs angle toward said one end of said gripping member.

11. Apparatus in accordance with claim 2, wherein said at least two U-shaped strips have spring-loaded fingers.

12. Apparatus in accordance with claim 11, wherein said end of said threaded rod and said one end of said gripping member are integrally attached.

13. A combination of an end finishing apparatus of claim 1 and a mating component having a means for engaging the rod member of the end finishing apparatus.

14. A combination of an end finishing apparatus of claim 11 and a female threaded mating component having a means for engaging the rod member of the end finishing apparatus.

15. Apparatus in accordance with claim 1, wherein:
said inwardly extending barbs include at least a first barb, a second barb circumferentially spaced from said first barb, and a third barb longitudinally axially spaced from said first barb.

16. Apparatus in accordance with claim 6, wherein:
said inwardly extending barbs include at least a first barb, a second barb circumferentially spaced from said first barb, and a third barb longitudinally axially spaced from said first barb.

17. Apparatus in accordance with claim 7, wherein:
said inwardly extending barbs include at least a first barb, a second barb circumferentially spaced from said first barb, and a third barb longitudinally axially spaced from said first barb.

18. Apparatus in accordance with claim 10, wherein:
said inwardly extending barbs include at least a first barb, a second barb circumferentially spaced from said first barb, and a third barb longitudinally axially spaced from said first barb.

19. Combination in accordance with claim 13, wherein:
said inwardly extending barbs include at least a first barb, a second barb circumferentially spaced from said first barb, and a third barb longitudinally axially spaced from said first barb.

20. Combination in accordance with claim 13, wherein:
said means for engaging the rod member is a female threaded means.

* * * * *